United States Patent [19]

Jalink, Jr. et al.

[11] Patent Number: 5,396,243
[45] Date of Patent: Mar. 7, 1995

[54] INFRARED LASER BATTLEFIELD IDENTIFICATION BEACON

[75] Inventors: Anthony Jalink, Jr., Newport News; James A. Hubert, Hampton; Don M. Robinson, Newport News, all of Va.

[73] Assignee: The United States of America as represented by the Secretary of the Air Force, Washington, D.C.

[21] Appl. No.: 999,698

[22] Filed: Dec. 23, 1992

[51] Int. Cl.⁶ .............................................. G01S 13/00
[52] U.S. Cl. ........................................ 342/54; 342/45
[58] Field of Search .................................. 342/45, 54

[56] References Cited

U.S. PATENT DOCUMENTS

| | | | |
|---|---|---|---|
| 3,954,228 | 5/1976 | Davis, Jr. | 244/3.16 |
| 4,277,170 | 7/1981 | Miles | 356/152 |
| 4,477,796 | 10/1984 | Kearsley | 340/105 |
| 4,685,800 | 8/1987 | Paquet | 356/152 |
| 4,814,769 | 3/1989 | Robin et al. | 342/45 |
| 4,837,575 | 6/1989 | Conner, Jr. | 342/45 |
| 4,995,101 | 2/1991 | Titterton et al. | 455/607 |
| 5,001,488 | 3/1991 | Joguet | 342/45 |
| 5,073,780 | 12/1991 | Barley et al. | 342/45 |
| 5,142,288 | 8/1992 | Cleveland | 342/45 |
| 5,274,379 | 12/1993 | Carbonneau et al. | 342/45 |

Primary Examiner—Theodore M. Blum
Attorney, Agent, or Firm—Bernard E. Franz; Thomas L. Kundert

[57] ABSTRACT

An Identification Friend or Foe (IFF) system uses $CO_2$ laser identification beacons on ground vehicles such as tanks, in conjunction with an existing (or future) Forward Looking InfraRed (FLIR) detection system on an attacking aircraft or ground vehicle, to provide a cost effective solution to the problem of identifying friendly targets on a battlefield. The $CO_2$ Laser can produce radiation only in the FLIR's spectral band, aiding stealth and improving signal to noise ratio. An acousto-optical modulator in conjunction with a specially shaped optical reflector steers the beam in the desired direction toward the FLIR in the attacking aircraft, aiding stealth and detection signal to noise ratio. The optical element also shapes the beam into the desired angular extent, needed for reception by the attacking aircraft. The beacons are triggered by a secure radio transmission signal from an approaching attack vehicle that initiates two or more pulses from the ground-vehicle-mounted beacons, timed according to an adjustable, predetermined code. The attacking vehicle's FLIR system would detect the pulses and place a marker on the screen over each identified friendly target.

9 Claims, 2 Drawing Sheets

INFRARED LASER BATTLEFIELD IDENTIFICATION BEACON

RIGHTS OF THE GOVERNMENT

The invention described herein may be manufactured and used by or for the Government of the United States for all governmental purposes without the payment of any royalty.

BACKGROUND OF THE INVENTION

The present invention relates generally to an infrared laser battlefield identification beacon, and more particularly to an Identification Friend or Foe (IFF) system using a $CO_2$ identification beacon on a ground vehicle such as a tank, in conjunction with an existing Forward Looking InfraRed (FLIR) detection system on an aircraft or on another ground vehicle.

The Desert Storm conflict in the Persian Gulf in early 1991 has highlighted the need to identify friendly targets on the battlefield. This identification capability is difficult to achieve because of the complexity of the problem, the large number of vehicles involved, and the resulting high cost. Today's technology allows targeting a ground vehicle well before positive visual identification can be made. Night operations have increased the reliance on sensors that have lower resolution than daytime visual optics, and "smart" weapons and weapon systems have greatly increased the effectiveness of our forces. The rapidity of battle with current systems and tactics makes the task of identification by a forward observer more difficult than in the past.

Another factor of modern warfare that became apparent during Desert Storm is the intermixing of typically "enemy" and "friendly" vehicle types on both sides of the conflict. The combination of international arms sales and changing political alliances along with the use of a coalition force structure have made confirmation of friend or foe impossible to guarantee—even from within visual range. As a result, current identification of forces is highly dependent on knowledge of position.

U.S. air forces already have a somewhat effective solution for identifying friendly targets in the air-to-air and ground-to-air arenas for at least two reasons. First, the nature of air combat requires long-range weaponry which makes the identification problem critical for antiair targeting. Second, the cost of airborne platforms has generally been sufficiently high to justify the additional expense of incorporating "Identification Friend or Foe" (IFF) systems on such platforms in order to minimize loss of valuable assets.

Ground forces have historically operated at a much slower pace, they attacked from a relatively close range, and the cost of their vehicles (until recently) has been relatively low. These factors, along with technical difficulties, have hindered the development of a fully effective identification system for air-to-ground and ground-to-ground combat. The recent incidents of fratricide, however, demand that solutions be provided to the identification problem.

The properties of any ID device need to be evaluated in relation to their effect on the following five factors:

(1) Observability: The device should not significantly increase the observability of our forces by enemy systems;

(2) Detectability: If the ID function of the device is detectable by the enemy, the enemy may be able to use it for ID as well;

(3) Exploitability: If the enemy can detect the ID function or determine or estimate its nature through intelligence methods, he may find a way to counter the system or to imitate its function;

(4) Reliability: Whatever system is considered, it must be able to provide reliable ID information to achieve minimum error in identifying friendly assets; and (5) Compatibility: Unless a separate ID system is added to the attacking aircraft or ground vehicle, ID devices will have to be compatible with existing weapon system capabilities.

An implied requirement of any ID system is its ability to perform in a method or tactic that is workable in modern warfare. Preferably, the ID system should function without increasing the operator's work load, without increasing vulnerability and without lowering effectiveness.

The following U.S. Pat. Nos. are of interest.
5,142,288 - Cleveland
5,073,780 - Barley et al
5,001,488 - Joguet
4,995,101 - Titterton et al
4,837,575 - Conner, Jr.
4,814,769 - Robin et al
4,685,800 - Paquet
4,477,796 - Kearsley
4,277,170 - Miles The patent to Conner, Jr, discloses a secure identification system which produces two interrogation pulses aimed at the target and separated from each other by a random time. The target detects the two interrogation pulses and prepares a reply signal which is controlled by the elapsed time. The patent to Cleveland discloses returning the same signature message as received, but is delayed by a predetermined time interval. The patents to Joguet, Barley et al, and Robin et al disclose friend-foe identification systems. The patent to Titterton et al discloses secure submarine communication. The patents to Paquet, Kearsley and Miles are of less interest.

SUMMARY OF THE INVENTION

An objective of the invention is to provide a cost effective isolation to the problem of identifying friendly target vehicles on a battlefield.

The invention relates essentially to an Infrared Laser Battlefield Identification Beacon. The beacon is intended to be used in conjunction with existing and future Forward Looking InfraRed (FLIR) systems. The beacon uses an infrared source which is a $CO_2$ laser. The $CO_2$ laser can produce radiation only in the FLIR's spectral band, aiding stealth and improving signal to noise ratio. A beam steering device, which is an acousto-optical modulator, in conjunction with a specially shaped optical reflector steers the beam in the desired direction toward the FLIR in the attacking aircraft or ground vehicle, aiding stealth and detection signal to noise ratio. The optical element also shapes the beam into the desired angular extent, needed for reception by the attacking vehicle.

The target vehicle's is beacon system comprises a beacon unit, a radio receiver, a controller unit, a power supply, and mounting hardware. The attacking vehicle's identification system comprises an existing FLIR unit, a detector, a display unit, a radio transmitter, and a trigger. The beacon is triggered by a secure radio transmission signal from an approaching attack vehicle that initiates two or more pulses from the target-vehicle-mounted beacon, timed according to an adjustable, predetermined code. The aircraft FLIR system would detect the pulses and place a marker on the screen over each identified friendly target.

This involves transmitting the center and radius of the target area, the coordinates and altitude of the attacker, and a beacon code to the targeted ground assets. If the target vehicle knows its own location, its distance from the center of the target area would determine whether a response is necessary. Receipt of the aircraft location will allow pointing the beacon beam as long as the friendly ground assets know their own coordinates, altitude, and attitude. The laser beacons on all friendly ground assets within the requested target area would respond by emitting a time-sequenced series of flashes in the direction of the attacker that match the requested code. The automatic detection equipment on the attacker's vehicle would verify the coded responses and present a graphic symbol on the video display at the location of the verified responses.

DETAILED DESCRIPTION

The invention is disclosed in a NASA Technical Memorandum SX-4294 for the USAF Wright Laboratory titled Investigation of the Ground Vehicle Identification Problem and a Proposed Solution by James A. Hubert and Antony Jalink, Jr., mailed Jan. 30, 1992. A copy of that document is enclosed with this application as filed, and is hereby incorporated by reference. A previous effort to develop a vehicle-mounted beacon for infrared sensors for 8–12 $\mu$m is described in a paper by Antony Jalink, Jr., James A. Hubert, Richard E. Davis, Don M. Robinson, Samuel Sokol, and Milton W. Skolaut, Jr.: Thermal Infrared Beacon - For Battlefield Identification of Friendly Ground Vehicles, NASA TM SX-4292, Nov. 1, 1991, a copy of which is enclosed herewith as an Appendix, and is hereby incorporated by reference.

Thermal IR or FLIR

The thermal IR capability was selected for the development of an identification system concept. Thermal Infrared (IR) sights, also known as Forward-Looking Infrared (FLIR) devices, operate in the wavelength band from 8–12 $\mu$m and offer a good combination of capabilities for the development of an ID system. Most of our ground antiarmor weapon systems are equipped with thermal IR sights. Also, much of our airborne ground attack capability is supported by thermal IR technology. This includes the Apache, IR Maverick, A-6E, LANTIRN, F-117A, and AC-130. All these FLIR systems are somewhat "smart" with target tracking capabilities, and so automatic detection of an ID signal should be possible with some system modification.

An effective solution for air-to-ground combat ID consists of a $CO_2$ laser beacon mounted on each battlefield vehicle and automatic detection of the beacon by the thermal IR receiver. A $CO_2$ laser was chosen because it can radiate energy efficiently at 10.6 $\mu$m (within the detection range of our FLIRs) and because it can be controlled (pointed and coded) easily. The beacon is triggered by a signal from an approaching attack vehicle that initiates two or more pulses from the target-vehicle-mounted beacon, timed according to an adjustable, predetermined code. The attack vehicle's FLIR system would detect the pulses and place a marker on the screen over each identified friendly target.

Figure 1:
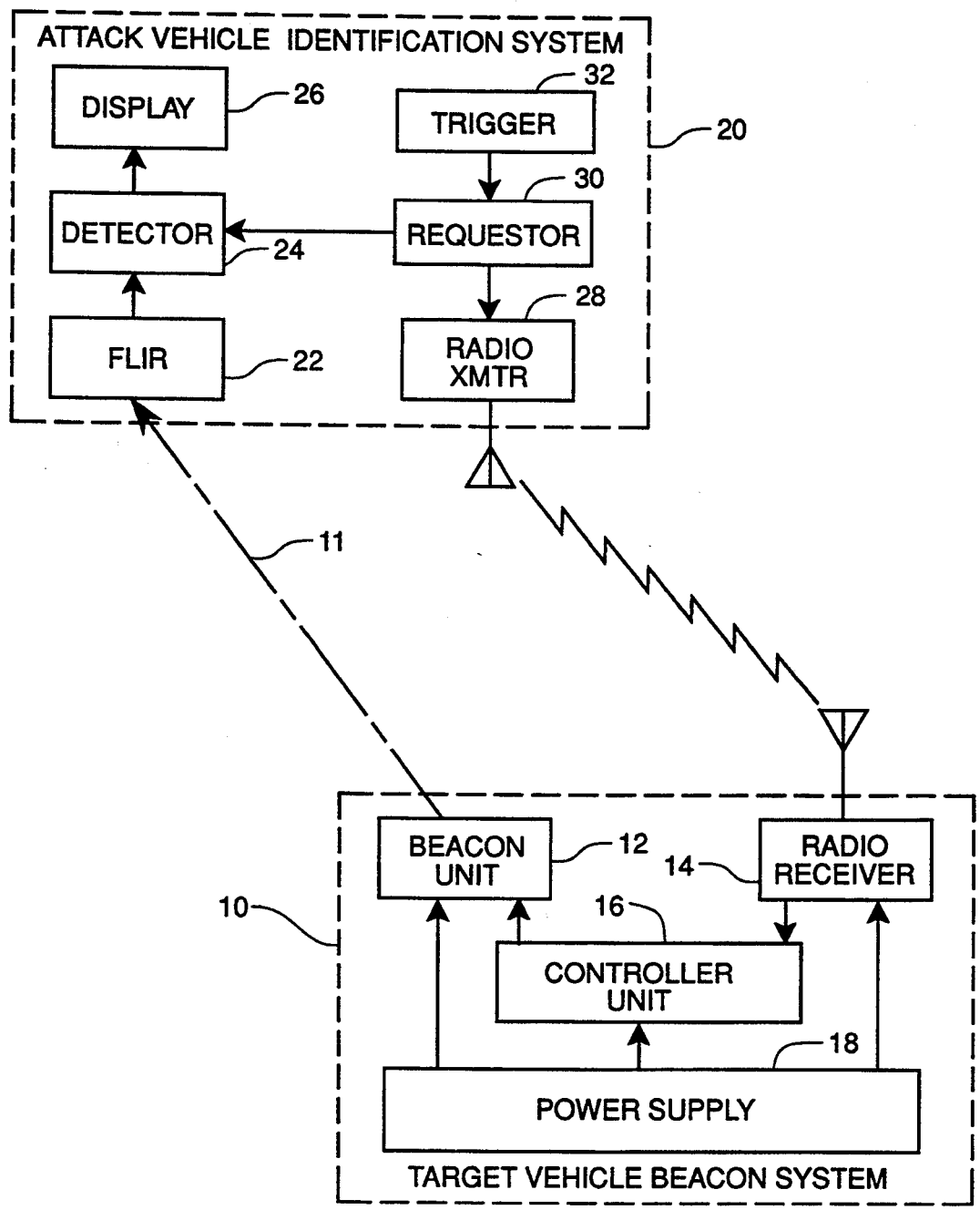
FIG. 1 is a block diagram showing a target vehicle infrared beacon system, and an attack vehicle identification system using a FLIR unit.

A block diagram of the identification system is shown in FIG. 1. The target vehicle beacon system 10 comprises a beacon unit 12, a radio receiver 14, a controller unit 16 and a power supply 18. There is also mounting hardware, not shown. The attack vehicle identification system 20 comprises an existing FLIR unit 22, a detector 24, a display unit 26, a radio transmitter 28, a requestor unit 30, and a trigger 32.

Operation

When the target area is within the FOV (Field-Of-View) of the sensor of the FLIR unit 22, a request for ID is initiated through a secure radio transmission from the transmitter 28. This involves transmitting the center and radius of the target area, the coordinates and altitude of the attacker, and a beacon code to the ground assets. If the ground vehicle knows its own location, its distance from the center of the target area would determine whether a response is necessary. Receipt of the attacker's location will allow pointing the beacon beam 11 as long as the friendly ground assets know their own coordinates, altitude, and attitude. The laser beacons 12 on all friendly ground assets within the requested target area would respond by emitting a time-sequenced series of flashes in the direction of the attacker that match the requested code. The automatic detection equipment 24 on the attacker's vehicle would present a graphic symbol on the video display at the location of the received responses.

The thermal systems in use do not have multiple-target tracking capability; thus, unless this capability is added, the label on the display will not move across the screen with the target. This means that the labels can be displayed for only a few seconds, but probably long enough for decision making. The attacker would assume that any targets with a graphic symbol were friendly, and he would either attack the preselected nonfriendly targets or select any target that was not identified as friendly.

Coding the Beacon

The security of the ID system must be enhanced by coding the beacon response. To make the coding effective, the beacon signal must be obscured from the enemy. Otherwise, the enemy can mimic the beacon by rapidly copying the coded response. Security of the system can also be aided by minimizing power requirements to make the signal difficult to detect. Coding can be accomplished by providing signals at precisely spaced intervals corresponding to individual video frames. Receipt of these signals at expected frame spacing will result in positive ID of friendly forces. An effective coding scheme consists of three pulses of the beacon that can each occur at a random position in preselected three-frame clusters during a response. This coding scheme will provide 19 different codes as shown in table 1. The random duplication of the code can occur once in 19 times if it is assumed that the enemy knows when to respond and can respond in the direction of the attacker. If the codes were arranged such that there were six blank frames between each group of three allowable frames for the code, the total duration of a single response would be 21 frames or about two-thirds of a second (for a FLIR scan rate of 30 frames per second). For any random selection of the 19 codes, the beacon would be able to respond in at least four and perhaps five or six directions during a single cycle of 27 frames (or 0.9 sec). This coding technique allows a response to overlapping requests from different directions to a significant degree, sufficient for the air-to-ground environment, but further analysis is required to determine if the capability is sufficient for the ground-to-ground environment (see Section below on GROUND-TO-GROUND IDENTIFICATION).

AIR-TO-GROUND IDENTIFICATION

Aircraft System Modification

The aircraft system would require several changes: a trigger 32 would have to be provided for the operator to request identification, the aircraft would have to be able to transmit the request, and the ability to automatically detect the coded pulses from the beacon would be added.

Request for Identification

The pilot would confirm acquisition of the correct target area and view the target area through the FLIR. The pilot would then trigger a request for identification and, within one to two seconds, the friendly forces would be identified on the FLIR screen. At this point, the pilot could select his target based on the choice of targets not identified as friendly and on Forward Air Controller (FAC) information about enemy location. In contrast, under current FAC-controlled procedures, the pilot would confirm that his prior-selected target was not friendly and employ the weapon. In this case, if the prior-selected target was identified as friendly, lack of time may prevent coordination with the FAC to select a second target. As a result, the pilot might have to abort the attack.

Transmitting the Request

The aircraft would transmit a message to the concerned ground assets containing the location and radius of the target area, the aircraft location, and the requested response code. This communication would have to be secure and reliable, and it would be as covert as necessary to avoid making the attacker more vulnerable. The aircraft would require a radio 28 compatible with the receiver used by the beacon system.

Automatic Detection

Automatic detection of the coded beacon pulses is required for effective operation of the ID system. The alternative to automatic detection is to rely on the pilot's ability to distinguish a signal on the video screen. This is undesirable because of pilot work load and the difficulty in distinguishing the signal. Without automatic detection, a high-intensity signal is required to provide a recognizable indication on the video screen. The FLIR receivers 22 would probably have to be modified to avoid saturation of the target signals by the normal vehicle signature so that pulsing of the target by the ID beacon can be recognized. Coding the beacon signal is possible only with automatic detection. Automatic detection by the FLIR system allows detection of the ID signal even when the signal would be impossible for the pilot to detect on the FLIR screen. This allows a lower power beacon or longer range capability. The beacon intensity must be sufficient to be detected at maximum range; however, intensity must be traded against possible detection by the enemy.

FLIR System Requirements

The IR Maverick missile was used to establish requirements for a thermal IR beacon. The other FLIR systems in the inventory have higher sensitivity and resolution, and so the Maverick offers the most demanding requirements. The Maverick FLIR has a 16-element array of detectors in a 4×4 arrangement. This system has a sensitivity threshold of 0.12K for a target that fills the sensor FOV; this is the system noise equivalent change in temperature. The FLIR scans the scene 30 times per second which leads to the requirement that the beacon must remain on for approximately 34 msec to be detected from any location within the FOV of the FLIR system. The proposed beacon must have an output of 6.5 watts per steradian (W/sr) for the FLIR to detect it under a selected set of (worst-case) conditions. These conditions were as follows:

1. A detection range of 8 km (5 mi).
2. An atmospheric haziness condition equivalent to 5 km visibility using the 1976 Standard Atmosphere.
3. A signal-to-noise ratio of 3 at the FLIR-system preamplifier output for reliable detection.

Beacon System Description

Each ground vehicle would be equipped with a $CO_2$ beacon system 10 consisting of the following: 1) A rugged $CO_2$ radio-frequency-driven laser, 2) Optics to steer the beam and expand it into a narrow cone, 3) A controller unit 16, 4) A radio receiver 14, 5) A power supply 18, and 6) Mounting hardware (not shown).

The $CO_2$ Laser Beacon

Figure 2:
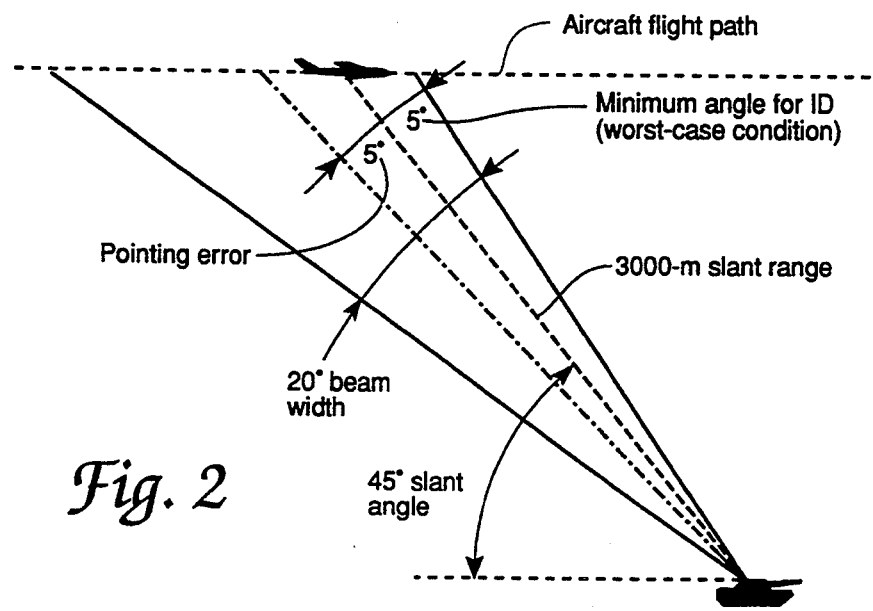
FIG. 2 is a sketch showing the size requirement of the infrared beam.

Radio-frequency-driven $CO_2$ lasers that are relatively small and lightweight are being developed to meet military specifications for ruggedness. The beam from the laser is on the order of 0.5 mm (0.02 in) in diameter. This beam must be spread into a cone in order to minimize pointing accuracy and tracking requirements. As shown in FIG. 2, the overall cone angle was set at 20°; this cone size allows an initial pointing error of 5°, and it also allows an aircraft traveling at 250 m/s (500 knots) to be within the beam for approximately 1.4 sec at a slant range of 3 km (2 mi) and a slant angle of 45°. This duration within the beam should be long enough to receive three pulses from the beacon. To meet the beam output requirement of 6.5 W/sr over a 20° cone with 20-percent efficiency of the optics, the laser must have an output of approximately 3 W. To produce three pulses in 1 sec, each lasting 34 msec (i.e. a 10-percent duty cycle), and assuming a laser "wall plug" efficiency of 10-percent, the laser will draw an average of 3 W from the ground vehicle if only a single request for ID is received. This compares with approximately 30 watts of power available from the M1-A1 Abrams main battle tank. An additional refinement to this system would be to have the attacking aircraft transmit its velocity vector to the beacon system. The beacon beam would then follow the aircraft, which would allow reduced beam size and, as a result, reduced beacon power. This refinement would increase the load on the communication system and would increase the request transmission time.

Beacon Optics

Figure 3:
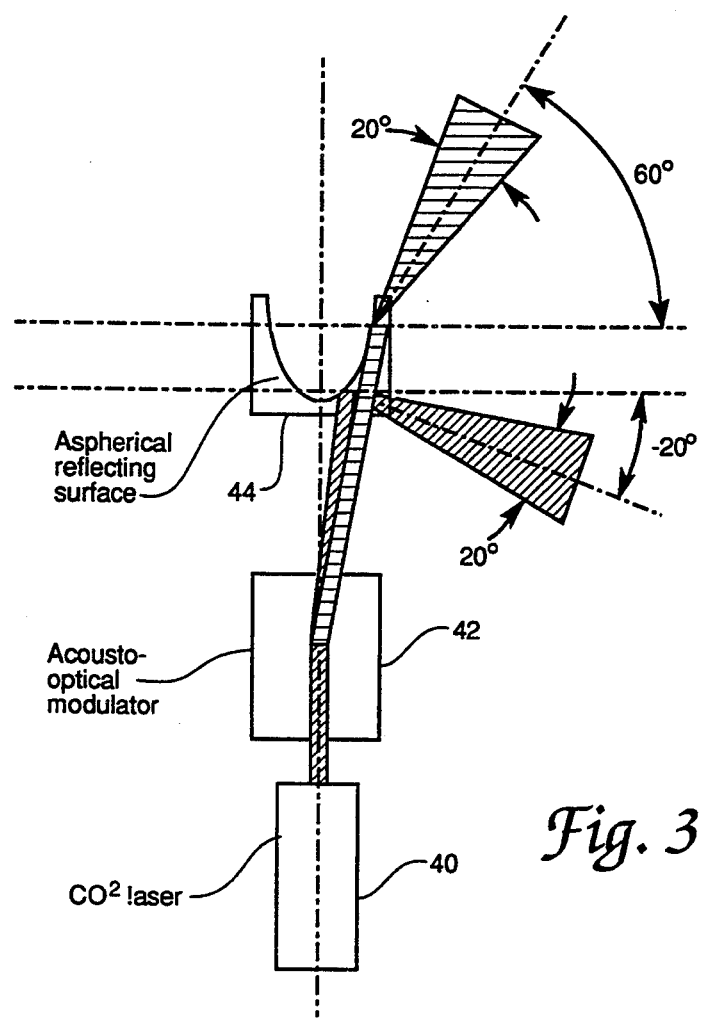
FIG. 3 is a functional block and schematic diagram of a beacon unit using a $CO_2$ laser.

The beacon unit 12 is shown in FIG. 3. The beam leaving a $CO_2$ laser 40 passes through an acousto-optical modulator 42 that steers the beam at an optical element 44 with an aspherical reflecting surface which points it in the desired direction (note that this element has circular symmetry in azimuth). The optical element 44 simultaneously spreads the beam in to the desired 20° cone. The optical element 44 has an interior reflecting surface that is designed to provide the desired beam shape; the location at which the beam strikes the surface determines its direction. The direction of the center of the beam can be anywhere within a 360° azimuth and at elevation angles from −20° to 60°. With any vehicle tilt up to 15°, the edge of the beacon beam can cover from −15° to 55° elevation. The optical element will be approximately a 1-cm (0.4 in) cylinder attached a few centimeters above the modulator 42. The modulator is placed immediately in front of the laser head; the total length of the system is approximately 0.7 m (2 ft). The modulator will require approximately 100 W of input power which, at a 10-percent duty cycle, will draw an average of 10 W from the vehicle. (Currently available modulators use a germanium crystal. Recent demonstrations using tellurium have shown an 80- to 90-percent reduction in power required.)

Beacon Mounting

A trade-off must be made to determine the distance that the laser head must be raised above the vehicle to enhance detectability. Obstruction by vehicle protrusions must be avoided; in addition, raising the beacon will reduce the obscuration of the beacon signature that occurs when the beacon is near the hottest portions of the vehicle. The beacon assembly must be rigid enough to avoid introducing significant pointing errors. To reduce the visible signature, the laser unit and mounting hardware should be coated with camouflage paint. The small optical assembly at the top of the beacon would have an antireflective coating for efficiency that would also minimize the visible signature. However, raising the laser unit will provide a silhouette that can be visible before the tank is. The beacon can be mounted with a quick-connect capability to allow removal of the unit to protect it when not needed and replacement of the unit if damaged.

Power Supply

A power supply 18 is required to convert vehicle input power to the output necessary to drive the laser 40, the acousto-optical modulator 42, and the control electronics 16. Normally, the power supply requires approximately 13 W average input from the vehicle and produces approximately 130 W peak output. Under worst-case conditions, as many as four or five requests could occur simultaneously. This condition would occur infrequently, but would require the capability for up to 65 W average input for 1 sec.

Controller

The controller 16 would receive the target area location, the attacker's location and a variable, time-sequenced code. The controller would decide whether to respond, and then it would direct the laser to produce the pulses according to the code and command the acousto-optical modulator to steer the beam in the proper direction. To accomplish this, the controller would have to monitor the location and attitude of the ground vehicle in real time. The response would need to be nimble enough to maintain the proper beacon direction during violent vehicle motions. If overlapping requests were received, the controller would determine how to interleave the various coded responses to achieve the minimum response time.

Radio Receiver

The radio receiver 14 could be an existing one on our ground vehicles; however, it must be compatible with airborne systems and be able to receive and decrypt secure transmissions. If compatible, secure communication capability does not exist, it will have to be added to either the ground vehicles or the airborne systems. The alternative may be to use intermediary ground communication equipment; however, the use of an intermediary system would add another layer of vulnerability, reliability, and availability concerns to the ID system and would increase the time required to accomplish the ID process.

Miscellaneous Considerations

Potential Improvements

It is possible to take advantage of the narrow spectral line width of the laser to lower the power requirements and thereby increase covertness. This would require optical band-pass filters and either a separate FLIR system or extensive modifications to existing FLIR systems. The additional expense would have to be traded off with the gain in performance. Future technology may include staring thermal systems. In this event, the source may not have to be emitting for a whole frame, depending on the FLIR system. As a consequence, a significant reduction in source power requirements would be gained. This may be helpful since future weapons will have increased range capability.

"Low-Tech" Application

The proposed beacon could be used at any level of sophistication such as the optimum system proposed in this report, a single-target query device, or a "dumb" signal that flashes constantly during a battle in all directions so that the pilot can see it on the FLIR screen. This lowest level system would require much more power and would still require modification of the receiver gain logic to minimize saturation of the target signals in the sensor due to target signature. Automatic detection and cuing would lower the power required and would still be effective when employed with a "dumb" flasher.

GROUND-TO-GROUND IDENTIFICATION

The $CO_2$ ID system described above for air-to-ground ID would also work for ground-to-ground ID. The large number of ground vehicles that would become involved in the ID process leads to an important issue. Air support would involve relatively infrequent ID requests; however, the addition of ground-vehicle-based ID requests could result in nearly simultaneous requests. This situation could produce two types of problems. If the requests overlap during transmission, the targeted receivers may have difficulty differentiating one from another. Also, if too many requests occur during any 1–2 sec time period, the beacon may become saturated in its ability to respond. To deal with overlapping request signals a "smart" request system could be designed to sense other request signals and coordinate its own request timing. This approach could lead to lengthy delays before ID was completed depending on the data communication rate. Analysis is required to determine the severity of this problem.

Concerning the potential saturation of the beacon system's response capability, the proposed system can respond to at least four nearly simultaneous requests. Analysis is required to determine the maximum request rate expected on the battlefield. If a higher rate of requests is expected than the proposed beacon can handle, the only option currently available leads to a system vulnerable to exploitation. It involves the following changes: 1) synchronize the video frame times of all involved FLIRs, 2) provide an omnidirectional beacon signal, and 3) use a universal, time-referenced code.

All vehicles would need to know the reference time and the currently active code. The time synchronization required for this case could be provided by GPS signals. This approach may require further modification to the FLIR systems to allow synchronization of the video frames with the reference time. This may be difficult to achieve since the FLIRs are mechanically scanned.

Omnidirectional operation can be provided using the same general design as that presented in this paper but with a larger laser beam diameter and/or smaller optics to direct the beam. The total field of coverage in FIG. 3 is 9 sr; assuming 50-percent optical efficiency, the laser must produce 120 W of power. With the 10-percent duty cycle, this would require 120 W of available power from the ground vehicle. Although this exceeds the 30 W currently available for the M-1A1, energy storage (such as a rechargeable battery) could help, assuming that the beacon does not operate constantly. With this solution, any request for ID would activate receiving beacons.

These beacons would respond with pulses timed to coincide with particular frame times that would be common to all receivers. The frame times would be chosen according to the current code which would be known by all friendly forces. Any friendly attacker could use the ID response to cue the friendly targets whether that attacker initiated the ID response or not.

If requests for ID overlap, the only effect would be that the beacons may flash longer to satisfy the additional requests. The problem with this solution, as mentioned above, is that an enemy could develop a system to copy most of the coded beacon signal to effectively mimic the friendly beacon. Also, a beacon flashing in all directions would be observable by enemy forces—increasing vulnerability.

If staring FLIR technology were in place for all FLIR systems, the beacon could multiplex a large number of beacon requests since the requirement to illuminate a requestor for an entire frame may not exist.

SPECIFIC APPARATUS FOR THE BEACON UNIT 12

The acousto-optical modulator 42, as currently envisioned, consists of two single axis modulators using a germanium crystal with specifications based on Brimrose Corporation model number GED-6.5-3-S to be placed with their steering axes separated by 90 degrees for two dimensional steering. These modulators consume 50 W of power to efficiently steer a beam and, as a result, are liquid cooled. This requirement would lead to excessive costs and should be avoided. The use of a modulator with a tellurium crystal would reduce the power consumption to 5 to 10 W, eliminating the liquid cooling requirement. This type of device was recently demonstrated by Brimrose Corporation for the Strategic Defense Initiative Office.

A more precise description of the aspherical reflecting surface 44 would be a convex surface designed to achieve two functions. One function is to steer the beam in a particular direction depending on the portion of the surface struck by the beam. The azimuth achieved will equal the angle made between a radius to the center of the beam as it strikes the surface and a reference direction. The elevation will depend on the radial distance from the center of the beam on the surface to the centerline of the surface. The minimum radius used would provide an elevation of −20° and the maximum radius an elevation of 60° from the horizontal plane of the reflecting surface. The second function of the shape of the surface is to spread the beam from a cylinder of 0.5 to 1.0 mm in diameter into a 20° cone while maintaining constant intensity along any radius of the cone. This must occur independent of the location of the center of the beam on the surface. The surface shape would be complicated in actual description, probably defined by a high-order polynomial segment of revolution. It may not be possible to completely achieve the requirements; in which case the shape would be optimized to minimize the variation in beam intensity while providing a usable 20° cone in the proper direction.

The $CO_2$ laser 40 could be derived from a United Technologies Optical Systems model number LC40-37Z-CW. This unit is constructed to be militarily qualifiable, but a number of changes would be made for this application. The unit quoted is capable of 40 W continuous output whereas the requirement for the laser beacon is lower. About 3 W is required, so a laser with 10 W capability would be sufficient. Also, the beam should be of equal intensity across its diameter. The device quoted is designed for single-mode operation whereas, multimode operation is easier to manufacture and could provide a more even distribution. Continuous lasers are usually liquid cooled; however, with only 30 W of peak input power on a (usually) 10 percent duty cycle, convection cooling would be sufficient (cooling fins may be required). Finally, the cost of the laser must be minimized, so cost reduction efforts would be applied to the revised design.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

TABLE I

| Combination | Pulse | Gap | Pulse | Gap | Pulse |
|---|---|---|---|---|---|
| 1 |  | x 6 | x | 8 | x |
| 2 |  | x 6 | x | 9 | x |
| 3 |  | x 7 | x | 10 |  x |
| 4 |  | x 7 |  x | 7 | x |
| 5 | x | 7 | x | 8 | x |
|  |  | x 7 | x | 8 | x |
| 6 | x | 7 | x | 9 | x |
|  |  | x 7 | x | 9 |  x |
| 7 | x | 7 | x | 10 |  x |
| 8 |  | x 8 |  | x 6 | x |
| 9 | x | 8 | x | 7 | x |
|  |  | x 8 | x | 7 | x |
| 10 | x | 8 | x | 8 | x |
|  |  | x 8 | x | 8 | x |
|  |  | x 8 | x | 8 |  x |
| 11 | x | 8 | x | 9 | x |
|  |  | x 8 | x | 9 |  x |
| 12 | x | 8 | x | 10 |  x |
| 13 |  | x 9 |  | x 6 | x |
| 14 | x | 9 | x | 7 | x |
|  |  | x 9 | x | 7 | x |
| 15 | x | 9 | x | 8 | x |
|  |  | x 9 |  | x 8 |  x |
| 16 |  | x 9 | x | 9 |  x |
| 17 | x | 10 |  | x 6 | x |
| 18 | x | 10 |  | x 7 | x |

TABLE I-continued

| Combination | Pulse | Gap | Pulse | Gap | Pulse |
|---|---|---|---|---|---|
| 19 | x | 10 | x | 8 | x |

What is claimed is:

1. An identification system comprising identification equipment on an attacking vehicle and beacon equipment on a target vehicle; wherein the identification equipment comprises a trigger coupled to a requestor unit which is coupled to a radio transmitter, a FLIR unit, a detector unit coupled to the FLIR unit and to the requestor unit, and a display unit coupled to the detector unit; and wherein the beacon equipment comprises a beacon unit which has means for producing an infrared beam, a controller unit coupled to the beacon unit, and a radio receiver coupled to the controller unit;

wherein the requestor unit includes means operative in response to pulling of the trigger by an operator (pilot) for doing the following: looking up target coordinates and radius, determining attack vehicle coordinates and altitude, generating a code for beacon response, informing the detector unit of code, instructing the detector unit to search for correctly coded responses, preparing an identification request message comprising target coordinates and radius, attack vehicle coordinates and altitude, and beacon code, and passing the message to the radio transmitter to transmit a signal;

wherein the radio receiver includes means for receiving said signal, and means operative in response thereto for initiating operation of the controller unit, and means whereby the beacon unit is controlled by the controller unit to produce at least two pulses of the infrared beam from the beacon unit, timed according to said beacon code;

wherein the FLIR unit includes means for receiving the infrared beam and in response thereto for passing pulse signals to the detector unit, and wherein the detector unit includes means responsive to said pulse signals for detecting pulses and causing a marker to be placed on the display unit over a symbol representing the identified target vehicle to mark it as friendly.

2. An identification system according to claim 1, wherein said beacon unit comprises an infrared source which produces the infrared beam, a beam-steering device and a specially shaped optical reflector, arranged so that the infrared beam passes through the beam-steering device to the reflector, and wherein the controller unit controls the beam-steering device to steer the infrared beam off the reflector in a desired direction toward the FLIR unit in the attacking vehicle.

3. An infrared identification beacon according to claim 2, wherein the infrared source is a $CO_2$ laser.

4. An infrared identification beacon according to claim 3, wherein the beam-steering device is an acousto-optical modulator.

5. An infrared identification beacon according to claim 4, wherein the acousto-optical modulator and the reflector shape the beam into a cone having a given angular extent, needed for reception by the attacking vehicle.

6. An infrared identification beacon according to claim 5, wherein said means whereby the beacon unit is controlled by the controller unit to produce pulses of the infrared beam comprises means for forming three pulses in respective designated pulse windows, wherein each of the pulses can occur in one of three positions in its designated pulse window, wherein said pulse windows are separated by a fixed time increment thereby allowing interleaving of multiple random code responses.

7. An identification system comprising identification equipment on an attacking vehicle and beacon equipment on a target vehicle; wherein the identification equipment comprises a trigger coupled to requestor unit which is coupled to a radio transmitter, a FLIR unit, a detector unit coupled to the FLIR unit and to the requester unit, and a display unit coupled to the detector unit; and wherein the beacon equipment comprises a beacon unit which has means for producing an infrared beam, a controller unit coupled to the beacon unit, and a radio receiver coupled to the controller unit;

wherein the requestor unit includes means operative in response to pulling of the trigger by an operator (pilot) for preparing an identification request message, enabling the detector unit to search for a response, and passing the message to the radio transmitter to transmit a signal;

wherein the radio receiver includes means for receiving said signal, and means operative in response thereto for initiating operation of the controller unit, and means whereby the beacon unit is controlled by the controller unit to produce at least two pulses of the infrared beam from the beacon unit, timed according to a given beacon code;

wherein the FLIR unit includes means for receiving the infrared beam and in response thereto for passing pulse signals to the detector unit, and wherein the detector unit includes means responsive to said pulse signals for detecting pulses and causing a marker to be placed on the display unit over a symbol representing the identified target vehicle to mark it as friendly.

8. An infrared identification method using identification equipment on an attacking vehicle and an infrared beacon unit on a target vehicle; comprising the steps:

pulling a trigger in the attacking vehicle;

in response to a signal from the trigger, initiating a requestor unit in the identification equipment to look up target coordinates and radius, determine attack vehicle coordinates and altitude, generate code for a beacon response, inform a detector in the identification equipment unit of the code, instruct the detector unit to search for correctly coded responses, prepare an identification request message comprising target coordinates and radius, attack vehicle coordinates and altitude, and said code;

transmitting a signal including said message;

receiving said signal at the target vehicle to initiate operation of a controller unit at the target vehicle, the beacon unit being controlled by the controller unit to produce at least two infrared beam pulses, timed according to said code;

receiving the infrared beam pulses at an FLIR unit in the identification equipment and via the detector unit detecting the pulses and causing a marker to be placed on the display unit over a symbol representing the identified target vehicle to mark it as friendly.

9. An infrared identification method according to claim 8, wherein said beacon code comprises three pulses each of which can occur in one of three positions in respective designated pulse window, wherein said pulse windows are separated by a fixed time increment thereby allowing interleaving of multiple random code responses.

* * * * *